United States Patent [19]

Almon

[11] Patent Number: 4,693,335
[45] Date of Patent: Sep. 15, 1987

[54] MULTI CHANNEL BOREHOLE SEISMIC SURVEYING TOOL

[76] Inventor: Harold A. Almon, P.O. Box 3816, Midland, Tex. 79702

[21] Appl. No.: 800,748

[22] Filed: Nov. 22, 1985

[51] Int. Cl.$^4$ .............. E21B 47/00; G01V 1/40
[52] U.S. Cl. .................. 181/102; 181/112; 73/151; 175/40; 367/25; 367/911
[58] Field of Search .............. 181/0.5, 102, 104, 112, 181/122, 402; 367/25, 35, 58, 56, 81, 86, 140, 141, 153, 154, 169, 171, 188, 911, 912; 340/853, 856, 858; 73/151; 175/40

[56] References Cited

U.S. PATENT DOCUMENTS

| | | | |
|---|---|---|---|
| 2,191,120 | 2/1946 | Slichter | 367/25 |
| 2,225,668 | 12/1940 | Subkow et al. | 73/152 |
| 2,436,563 | 2/1948 | Frosch | 73/151 |
| 2,717,368 | 9/1955 | Swan | 367/58 |
| 2,722,282 | 11/1955 | McDonald | 181/402 |
| 2,792,067 | 5/1957 | Peterson | 181/112 |
| 2,810,118 | 10/1957 | Swan | 339/18 P |
| 2,842,220 | 7/1958 | Clifford | 367/56 |
| 2,865,463 | 12/1958 | Itria | 367/25 |
| 2,942,112 | 6/1960 | Hearn | 340/857 |
| 2,986,693 | 5/1961 | Alder | 340/858 |
| 3,056,463 | 10/1962 | Summers | 367/912 X |
| 3,091,695 | 5/1963 | Peterson | 340/858 |
| 3,103,644 | 9/1963 | Burton | 340/858 |
| 3,188,607 | 6/1965 | Woodworth | 367/154 |
| 3,191,145 | 6/1965 | Summers | 340/858 |
| 3,376,948 | 4/1968 | Morrow | 181/0.5 |
| 3,406,359 | 10/1968 | Welz et al. | 340/858 |
| 3,707,700 | 12/1972 | Lafont | 340/858 |
| 3,713,085 | 1/1973 | Laurent et al. | 367/154 |
| 3,725,857 | 3/1983 | Pitts, Jr. | 340/858 |
| 3,921,755 | 11/1975 | Thigpen | 367/177 |
| 3,928,841 | 12/1975 | Vogel | 340/856 |
| 3,959,767 | 5/1976 | Smither et al. | 340/858 |
| 4,072,923 | 2/1978 | Siems et al. | 367/678 |
| 4,109,757 | 8/1978 | Hebberd | 367/188 |
| 4,160,229 | 7/1979 | McGough | 367/154 |
| 4,204,188 | 5/1980 | Weichart et al. | 367/154 |
| 4,346,954 | 8/1982 | Appling | 367/154 |
| 4,355,310 | 10/1982 | Belaignes et al. | 364/425 |

Primary Examiner—Deborah L. Kyle
Assistant Examiner—Brian S. Steinberger
Attorney, Agent, or Firm—Marcus L. Bates

[57] ABSTRACT

Apparatus for seismic surveying a borehole by simultaneously measuring seismic signals at a plurality of elevations within the borehole. A resilient tubular member is filled with a liquid and the length of the tubular member is divided into several adjacent series arranged chambers. A sensor for receiving the seismic signal is placed within each chamber, and means are provided for measuring and storing the signal received by each of the sensors. The sensors are suspended within the tubular member by a stress member, and the stress member is suspended from a bulkhead which divides the adjacent chambers, and which isolates the chambers one from the other. This arrangement of parts provides a unique structure which enables geologizing a borehole seismically in a new and unobvious manner.

8 Claims, 7 Drawing Figures

MULTI CHANNEL BOREHOLE SEISMIC SURVEYING TOOL

BACKGROUND OF THE INVENTION

This invention relates to geophysical prospecting method and apparatus, as may be employed in reflection seismic survey, as for example correlation shooting and continuous profiling. Reference is made to the U.S. Pat. Nos. 2,792,067, Peterson; 4,072,923, Siems et al; 2,942,112, Hearn; 2,810,118, Swan; 2,842,220, Clifford et al; 2,865,463, Itria; and 2,717,368, Swan for further background of this invention. Reference is also made to the art cited in these patents, as well as the entire field of search represented by these previously issued U.S. patents.

Siems et al '923 connects a number of transceiver units to a central station by means of a wide band data transmission link and an interrogation link. This reference involves circuitry by which seismic detectors can be electrically interconnected.

Hearn '112 teaches simultaneously transmitting a plurality of information carrying signals over a single conductor, wherein any number of separate information carrying signals may be transmitted over a single conductor simultaneously without interferring with each other.

Swan '118 and '368 series connects various hydrophones in a string wherein each of the hydrophones employ three amplifiers and brings the resultant signal to a logging truck.

Clifford et al '220 diagrammatically illustrates series connected geophones located downhole in a borehole for seismic surveying the borehole.

Itria '463 employs a multiply conductor cable having a plurality of detectors affixed thereto for the seismic surveying of a borehole.

The present invention differs from the prior art of record by the provision of a plurality of seismic sensor units, such as a geophone or hydrophone, each located in series relationship and at different elevations within a borehole, with each of the sensors being supported from a stress member, and each of the sensors being acoustically isolated from any adjacent sensors.

SUMMARY OF THE INVENTION

The present invention comprehends both method and apparatus for seismic surveying a borehole drilled into the earth.

The apparatus comprises an elongated resilient tubular housing of a size to be telescopingly received within the borehole. Within the tubular housing, there is supported a plurality of sensors, each being isolated from the other, with there being electrical circuitry means by which all of the sensors are connected to a receiver apparatus. The receiver apparatus receives the signals generated by each of the sensors and the signal can be stored for future analysis.

The present invention enables the signals generated by the sensors to be delivered to the receiver at the time they are generated, thereby providing accurate time delay data related to the generation of the seismic signal and the receipt of the seismic signal by the sensor.

Accordingly, a primary object of the present invention is the provision of a means by which a long string of transducers for receiving seismic signals can be disposed within a borehole so that the intervening strata can be surveyed simultaneously using a single seismic charge or wave generation.

Another object of the present invention is the provision of a plurality of sensors located in separate liquid filled chambers and positioned at predetermined locations downhole in a borehole whereupon a seismic disturbance generated at or near the surface of the earth creates seismic waves which travel down to the individual sensors which generates a signal which is returned to the surface of the earth, thereby providing great accuracy respective to the critical time intervals involved therein.

Still another object of this invention is the provision of an elongated, resilient, housing which is divided into liquid filled chambers, each having a seismic sensor contained therein, which avoids damage to the apparatus by the pressure differential and fluid density difference between the well fluid and the liquid contained within the apparatus.

A further object of the present invention is the provision of a seismic system for logging a wellbore by the provision of a plurality of series connected seismic sensors acoustically isolated from one another so that negligible interaction between adjacent sensors is encountered.

An additional object of the present invention is the provision of a method for rapidly determining the characteristics of the strata through which a borehole extends by the provision of a plurality of series connected sensors arranged at predetermined intervals within the borehole and isolated from one another in a manner to individually receive seismic wave energy and transduce the energy back up to the surface of the earth.

These and various other objects and advantages of the invention will become readily apparent to those skilled in the art upon reading the following detailed description and claims and by referring to the accompanying drawings.

The above objects are attained in accordance with the present invention by the provision of a method with apparatus fabricated in a manner substantially as described in the above abstract and summary.

DETAILED DESCRIPTION OF THE PREFERRED EMBODIMENT

Figure 1:
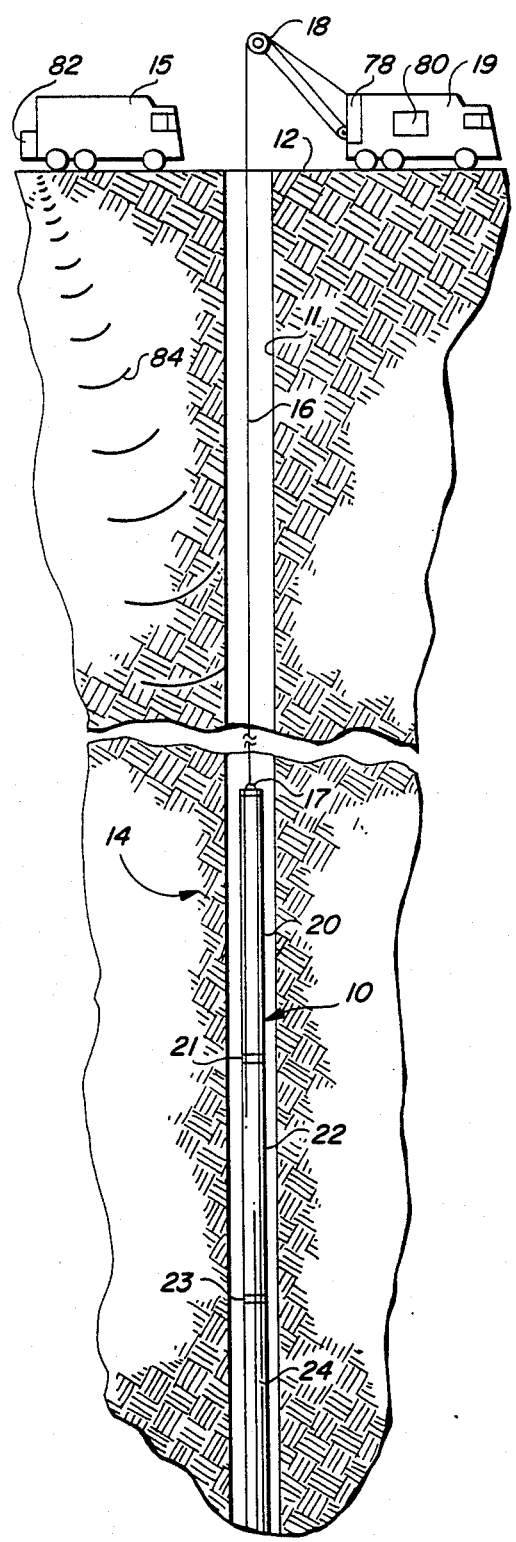
FIG. 1 is a part schematical, part diagrammatical representation of a cross-section of the earth structure, showing a wellbore formed therein, and illustrating the present invention in conjunction therewith.

In FIG. 1 of the drawings, there is broadly disclosed in a diagrammatical manner, method and apparatus by which the present invention can be carried out. The apparatus 10 of the present invention is shown located downhole in a borehole 11. Numeral 12 indicates the surface of the ground, and the borehole 11 is seen to extend downhole through various different geological formations or subsurface strata 14. Numeral 15 broadly illustrates a shooting or vibrator vehicle having apparatus 82 associated therewith for creating a seismic wave 84 which extends down through the strata 14 where the seismic wave is detected and transmitted to the surface by means of wireline 16.

The wireline 16 is of the prior art, and is supported about a pulley 18, and is electrically and supportingly connected to a logging truck 19 of the prior art. The logging truck 19 includes apparatus 78 for manipulating the apparatus 10 as well as a receiver 80 for receiving and storing signals generated by the apparatus 10 and conducted along wireline 16 to the receiver 80.

The apparatus 10 is used for seismic surveying a borehole 11 drilled into the earth structure 14 and comprises an elongated resilient tubular housing of a size to be telescopingly received within the wellbore 11. The tubular housing is subdivided into a plurality of interchangeable sections 20, 22, and 24. The sections 20–24 are separated at section coupling members 21 and 23. The apparatus 10 has an uppermost terminal end 17 in the form of a wireline head coupler which enables the apparatus to be mechanically and electrically connected to the wireline 16, thereby enabling the wireline 16 to support the entire apparatus 10 as well as transmitting or conducting signals generated by the apparatus 10 uphole to the receiver 80.

Figure 2:
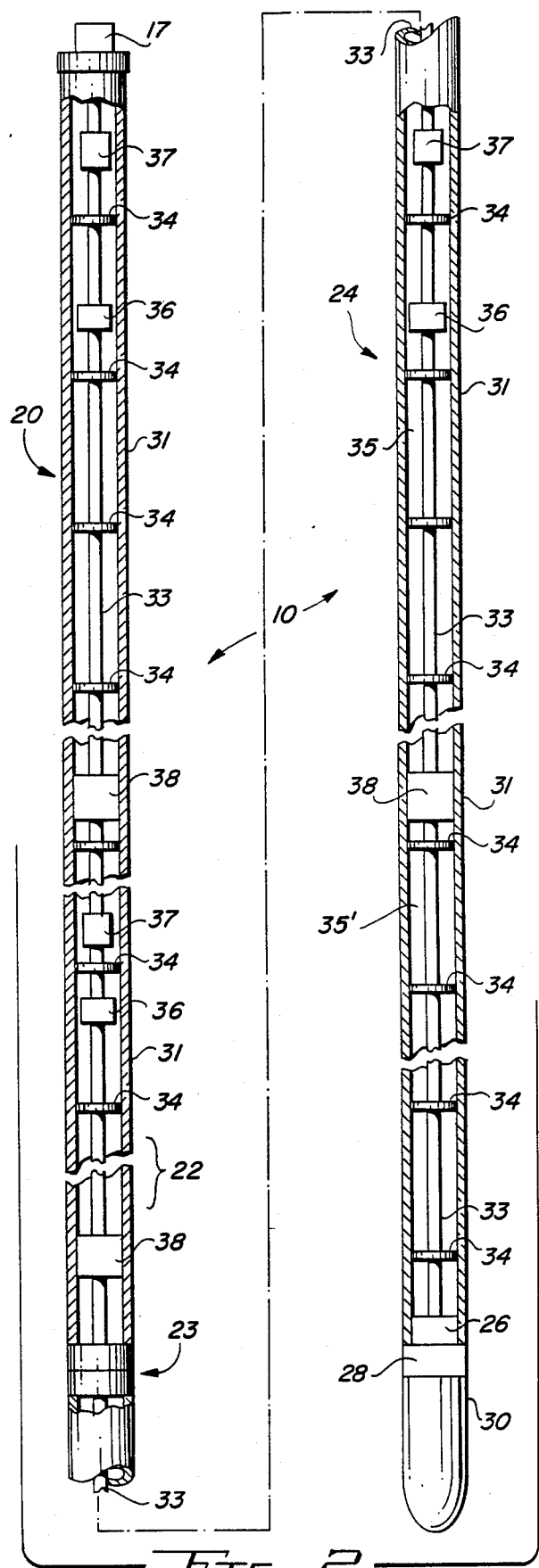
FIG. 2 is an enlarged, diagrammatical representation of a tool string made in accordance with the present invention.

FIG. 2 sets forth additional details of the apparatus 10. As seen in FIG. 2, a seal plug 26 is located at the opposed lower end of the tubular housing. A sinker connection 28 connects a sinker sub 30 to the bottom end of seal plug 26 to thereby provide sufficient weight to maintain the entire apparatus 10 properly gravitated into axial alignment respective to the vertical axis of the borehole.

The apparatus 10 includes a main tubular housing 31 in the form of a resilient hose made of elastromeric material of suitable acoustic characteristics and strength. The tubular housing can be suitably reinforced with plies of fabric and steel or other suitable stress material. Alternatively, a less expensive polyethylene, polyurethane, or polyvinyl chloride hose with suitable inside diameter and sufficient strength to withstand the expected working pressure and temperature can be used as the main housing. Any number of sections 20, 22, and 24 can be series connected as indicated by the numerals 21 and 23, or the housing can be made up of longer lengths to house more than one channel per section.

Electrical signal conductors 33 extend along the central axis of the main housing. Spacers 34 maintain the conductors 33 spaced from the inside wall surface of the main housing. Numeral 35 indicates the interior of the main housing.

In the illustrated embodiment of the invention, one sensor 36 is located within each section 20, 22, and 24 of the main housing. The sensors are known to those skilled in the art, and can be a geophone, a hydrophone, or any other transducer having sufficient sensitivity for receiving seismic wave energy 84 that may travel through the subsurface strata 14 located downhole within a wellbore. Where deemed desirable, a preamplifier 37 can be associated with each of the sensors 36, or alternatively, a single preamplifier can be located above the uppermost section 20 for treatment of the plurality of signals prior to transmitting the signals along wireline 16.

A plurality of spaced apart fluid block means 38 are located within the main housing 31. The internal fluid block 38 defines spaced chambers within which there is disposed the before mentioned spacers 34 and at least one stress member, depending on the construction or material of the main tubular housing 31.

It is preferred to use three stress members 39, 40, and 41 arranged in radially spaced relationship respective to one another, to the conductors 33, and to the interior wall surface of the main housing. The stress members preferably are arranged 120° apart and parallel to one another in the illustrated manner of the drawings.

Figure 3:
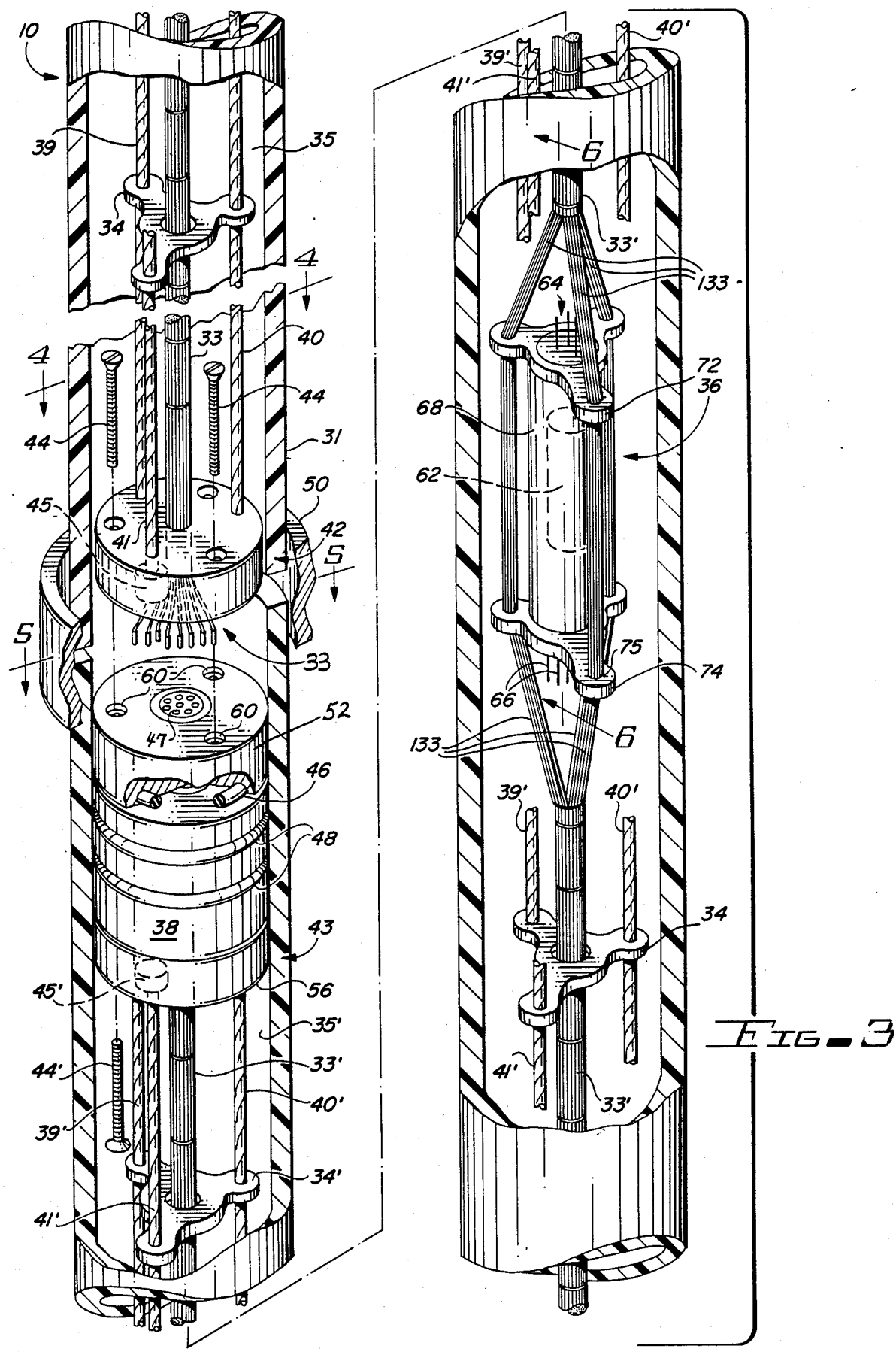
FIG. 3 is an enlarged, broken, longitudinal, part cross-sectional representation of part of the apparatus disclosed in the foregoing figures.
Figure 4:
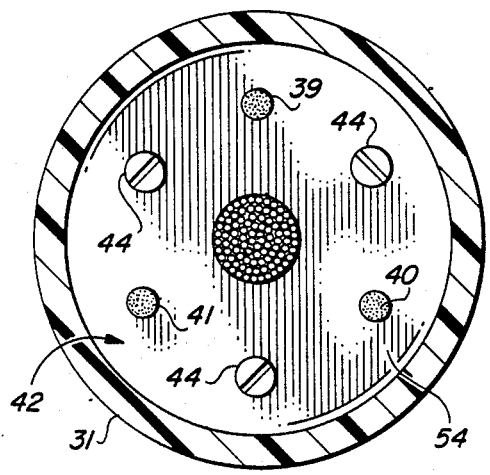
FIG. 4 is a cross-sectional view taken along line 4—4 of FIG. 3.
Figure 5:
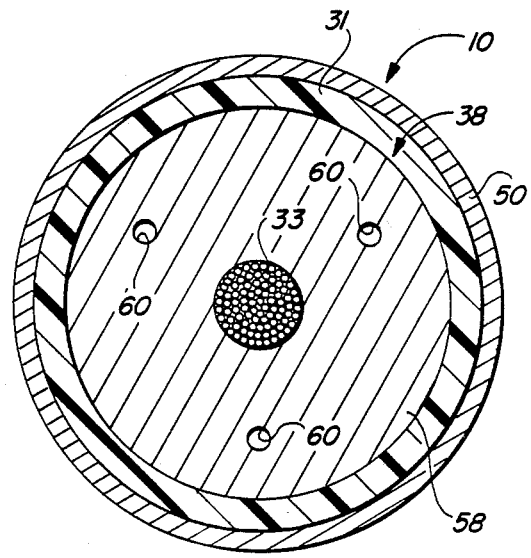
FIG. 5 is a cross-sectional view taken along line 5—5 of FIG. 3.

FIGS. 3–5, together with other figures of the drawings, illustrate the details of the tubular main housing 31, signal conductors 33, stress members 39, 40, and 41, sensor 36, and the internal fluid block means 38. The fluid block means divides the interior of the main housing into the before mentioned fluid containing chambers 35, 35', with there being one fluid chamber located between adjacent fluid block means. The fluid block includes opposed end caps 42, 43 that are attached to the fluid block barrel and consequently to one another by means of a through bolt or cap screw 44. The end caps include stress members therewithin so that the entire weight of the apparatus 10 is progressively transferred into the three stress members, as one progresses downhole respective to the apparatus 10.

O-ring 46 is received between members 52 and 38 for sealing the terminals, 47' and conductors, 33' against fluid flow through the fluid block means 38. O-rings 48 circumferentially seal the fluid block means to the housing 31. Clamp 50 compresses the members 31 and 38 together and arrest movement between the fluid block means and the housing. The fluid block means, stress members and housing firmly but resiliently anchor the sensor body 62 therewithin. Opposed ends of the support member 68 are in the form of outwardly diverging arms 72, 74 having a marginal end thereof apertured at 75 for receiving the conductors 133 therethrough. The spacer 34 similarly receives a stress member 39 through the aligned apertures 73 in the illustrated manner of FIGS. 3 and 7. Accordingly, the sensor 36 is supported from the parallel, spaced, radially disposed stress members, while the stress members and sensor are maintained axially aligned respective to one another, to the housing, and to the borehole.

In operation, the main housing of the apparatus 10 is rolled onto a four foot diameter drug core and arranged so that the sinker 30 can easily subsequently be placed within the entrance of the borehole 11, and thereafter the drum can be revolved to unwind the tubular housing until the connector 17 becomes available and can be attached to the end of the wireline 16. The apparatus is then manipulated by the logging truck 19 which lowers the apparatus downhole adjacent to the strata 14 to be analyzed. It is preferred that at least three sections 20, 22, and 24 having at least one sensor 36 contained within each section be utilized, with the sensor 36 being located exactly on 100 foot intervals, for example. Accordingly, the main housing will be a minimum of 300 feet long, and if the logging crew properly perform their duties, the apparatus 10 can be placed so that the accumulative error usually associated with a seismic operation of this type is reduced to a minimum.

A seismic wave 84 is generated by an explosive placed in a shallow hole; or alternatively, as illustrated in FIG. 1, the seismic wave travels down through the strata 14 and is received by the individual sensors 36 contained within the chambers formed within sections 20, 22, and 24 of the main housing in FIG. 2. The seismic wave signal travels through the fluid contained within the borehole, and is transmitted through the resilient tubular housing 31, and into the incompressible fluid, preferably oil, contained within chambers 35, 35'. The fluid block 38 precludes the signal received through the fluid at 35' from interferring with the fluid contained within chamber 35, for example, so that the sensor associated with a specific chamber responds primarily to the seismic wave energy associated with that interval of the wellbore.

Moreover, the hydrostatic head of the well fluid effects a pressure differential on the opposed ends of the main housing which is held to a value well within the structural integrity of the fluid blocks and tubular housing.

The generated signal can be amplified and sent up the wireline 16 to the receiver 80 of the logging truck 19; or alternatively, the signal can be stored downhole within the apparatus 10, and subsequently evaluated.

Multiplex transmission means for simultaneously, or almost simultaneously, sending signals from each of three or more different sensors 36 along a minimal number of conductors, even a single conductor, in the wireline 16 to the logging truck are known to those skilled in the art. The prior art provides a selection of such systems which can be advantageously used with the present invention.

The present apparatus provides a method of obtaining a multiplicity of seismic signals measured at different elevations or intervals from a location downhole in a wellbore, and made available for use above the surface of the ground. The method of the present invention comprises filling a resilient tubular member 31 with an incompressible fluid at 35, and isolating adjacent series arranged marginal lengths 20, 22, and 24 of the main body to form adjacent, isolated, fluid filled chambers 35, 35'. A sensor 36 is suspended at 62 and 68 within each chamber 35, for example, and each sensor is connected at 64, 66 to a suitable receiver, as for example by means of the conductor 33, wireline 16, and receiver 80.

Figure 7:
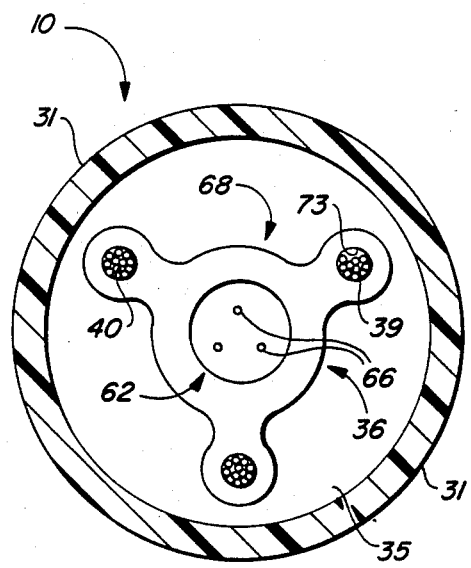
Figure 6:
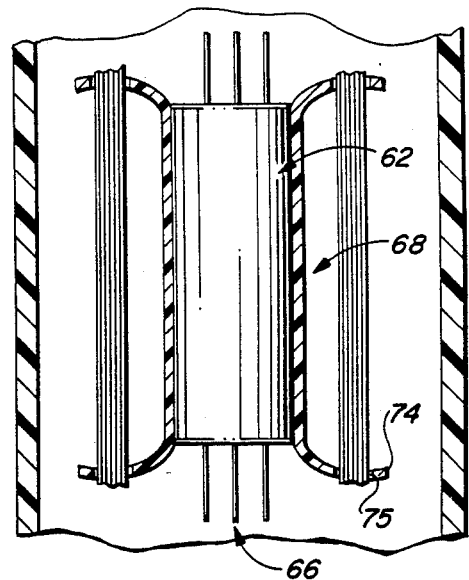
FIG. 6 is an enlarged, fragmentary, detailed, cross-sectional view of part of the apparatus disclosed in the foregoing figures; and, FIG. 7 is a cross-sectional view taken along line 7—7 of FIG. 6.

The method of the present invention includes isolating each adjacent liquid filled chamber 35, 35' from one another by placing a rigid bulkhead 38 at opposed ends of each chamber, and further includes the step of connecting a flexible cable 39, 40, and 41 between adjacent bulkheads, spacing the cable from the interior wall of the resilient main housing, and supporting the sensor from a medial length of the cable by support means 68 as seen in FIGS. 6 and 7. The resilient main housing must have physical characteristics that enable a seismic wave to travel from the well fluid, through the housing, and into the liquid contained within the housing where the signal is detected by the sensor.

Each sensor is connected to circuit means 33, and the circuit means 33 extend through each of the bulkheads or fluid block means 38 and to the wireline 16.

The maximum number of channels that may be employed is determined by the method of signal transmission or the maximum number of channels available in the receiver 80.

Logging truck 19 and wireline 16, along with receivers 80, are well known to those skilled in the art of logging boreholes. Apparatus for creating seismic waves 84 for seismic study of subsurface strata 14 are known to those skilled in the art. It is believed novel to utilize a resilient main housing, the interior of which is divided into chambers 35, 35', with the chambers being isolated from one another by a fluid block means, so that a sensor can be suspended within each of the liquid filled chambers in a manner which enables a multiplicity of the sensors to be spaced apart and simultaneously transduces the energy of the seismic wave into an electrical signal that is intercepted by the sensors at a plurality of intervals without the necessity of relocating the sensors for measuring each interval.

Heretofore it has been impossible to accomplish such multiple channel seismic surveying in a deep borehole because no means such as the fluid block, was provided for overcoming the pressure differential between the top and the bottom of a section. Short sensor sections, connected one to another by lengths of stress members reinforced conductor cable, could be used in relatively shallow boreholes only because of the dangers of such irregular packaging becoming stuck or entangled and thus causing loss of equipment and/or the borehole.

As a subcombination of the present invention, it is believed novel to employ the stress members and the fluid block means for achieving the isolated liquid filled chambers within which the sensor is suspended.

In a similar manner, this invention may be used as a multiple channel energy source by supplying power to transducers. The frequency and power of the signal supplied to the transducers can be controlled to have a series of calibrated energy sources. Such a signal transducer for use in this manner was patented by Dr. Abbott, U. S. Navy Under Sea Research, Civil Service, about 1970.

The density of oil compared to the well fluid is of the order of 6.4/8.4=0.75 for water; and 6.4/13=2.1 for heavy mud; and, accordingly, a 1000 foot resilient housing could have a pressure differential of 1000[(13−6.4/2=3300 psi effected across the opposed ends thereof under extreme conditions. This condition would require a tubular housing which is reinforced to such an extent that it would not exhibit the necessary resiliency required for suitable passage of the seismic waves therethrough; whereas dividing the 1000 foot length into 100 foot sections, as taught herein, reduces this maximum pressure differential to which the housing is subjected to a value of only 330 psi, which is easily withstood by a number of commercially available two ply reinforced hoses. A lower mud density permits the use of a thinner, more resilient housing wall material. Hence, there are operating conditions where the well fluid density enables a very lightweight tubular housing to be advantageously employed.

It is considered within the comprehension of this invention to transmit the signals generated by the sensors by other means such as, for example, multiplexing with fiber optics.

I claim:

1. Apparatus for seismic surveying a borehole drilling into the earth comprising an elongated resilient tubular housing of a size to be telescopingly received within the borehole, a plurality of sensors, a plurality of stress members, and a plurality of fluid block means;

said housing having a closure means at the upper end thereof by which a stress member is connected to a wireline, and by which signals received by the sensors are transmitted along the wireline to the surface of the ground;

said fluid block means are received within said housing in spaced relationship respective to one another, and in sealed relationship respective to the housing, and thereby form axially spaced sealed chambers between adjacent fluid block means;

each of said fluid block means is a cylindrical member having an outer cylindrical surface thereof sealed respective to an inner cylindrical surface of the housing, means for arresting relative movement between said fluid block means and said housing;

said stress member is an elongated, flexible load carrying member which has opposed ends affixed to adjacent ones of said fluid block means; there being at least one stress member located in each of said chambers and arranged parallel to the central axis of the housing;

said stress member having opposed terminal ends connected to adjacent ones of said fluid block means with the tension of one stress member being transferred through each of said fluid block means and into a next adjacent stress member;

support means by which at least one of said sensors is supportedly attached to the stress member and located within each of said chambers;

each sensor is provided with circuit means by which a seismic signal is transferred through the fluid block means and into the wireline;

and an incompressible fluid contained within each said chamber, whereby;

said apparatus can be attached to a wireline, lowered into a borehole, so that seismic energy resulting from the detonation of a nearby seismic charge can be received by each sensor and transmitted uphole for analysis.

2. The apparatus of claim 1 wherein said support means by which each sensor is supported from the stress member is a resilient enclosure having opposed marginal ends extended into supported relationship respective to the stress member.

3. The apparatus of claim 1 wherein there are three parallel radially spaced stress members spaced 120° apart and received within each fluid chamber.

4. The apparatus of claim 1 wherein said support means by which each sensor is supported from the stress member is a plastic housing which captures the sensor therewithin, the upper and lower marginal ends of the housing are flared outwardly into captured relationship respective to the stress members;

wherein there are three parallel, radially spaced stress members spaced 120° apart and received in each fluid chamber.

5. In an apparatus for seismic surveying a borehole, wherein the borehole extends into the earth and through geological formations, the improvement comprising:

an elongated resilient tubular housing of a size to be telescopingly received within the borehole, a plurality of sensors, a plurality of stress members, and a plurality of fluid block means;

a closure means at the upper end of said housing by which a stress member can be connected to a wireline, means by which signals received by the sensors are transmitted along the wireline to the surface of the ground;

said fluid block means are received within said housing in spaced relationship respective to one another, and in sealed relationship respective to the housing, and thereby form axially spaced sealed chambers between adjacent ones of said fluid block means;

each of said fluid block means is a cylindrical member having an outer cylindrical surface thereof sealed respective to an inner cylindrical surface of the housing, means for arresting relative movement between said fluid block means and said housing;

said stress member is an elongated, flexible load carrying member, means connecting said fluid block means to said stress member; said stress member has a medial length located in each of said chambers and is arranged parallel respective to the central axis of the main body;

said stress member having opposed terminal ends connected to adjacent ones of said fluid block means with the tension of one stress member being transferred through each of said fluid block means and into a next adjacent stress member;

support means by which said sensors are supportedly attached to each stress member, with there being one sensor located within one said chamber; and an incompressible fluid contained within each said chamber;

each sensor is provided with circuit means by which a seismic signal is transferred through the fluid block means and into the wireline, whereby;

said apparatus can be attached to a wireline, lowered into a borehole, so that seismic energy resulting from a seismic wave generator can be received by each sensor, the signal generated by the sensor, and transmitted uphole for analysis.

6. The improvement of claim 5 wherein said support means by which each sensor is supported from the stress member is a resilient enclosure having opposed marginal ends extended into supported relationship respective to the stress member.

7. The improvement of claim 5 wherein there are three parallel radially, spaced stress members spaced 120° apart and received wtihin each fluid chamber.

8. Method of obtaining a multiplicity of seismic signals simultaneously measured at different elevations from a location downhole in a wellbore during a surveying operation comprising the steps of:

(a) filling a resilient tubular member with an incompressible fluid;

(b) isolating adjacent series arranged marginal lengths of the member to form adjacent fluid filled chambers so that when the tubular member is lowered into a borehole, the hydrostatic pressure which is effected on a lower one of said chambers does not increase the pressure within an upper one of said chambers;

(c) isolating each adjacent fluid filled chamber from one another by placing a rigid bulkhead at opposed ends of each chamber and thereby form axially spaced sealed chambers between adjacent bulkheads;

(d) suspending a sensor within each chamber and connecting each said sensor to a suitable receiver;

(e) carrying out step (d) by connecting a flexible cable between adjacent bulkheads, spacing the cable from the interior wall of the hose, and supporting the sensor from a medial length of the cable;

(f) connecting each sensor to a circuit means, extending the circuit means through each of the succeeding bulkheads, and using a wireline to transmit the signal generated by the sensor.

* * * * *

UNITED STATES PATENT AND TRADEMARK OFFICE
CERTIFICATE OF CORRECTION

PATENT NO. : 4,693,335

DATED : September 15, 1987

INVENTOR(S) : HAROLD A. ALMON

It is certified that error appears in the above-identified patent and that said Letters Patent is hereby corrected as shown below:

Column 4, line 32, insert --47-- after "terminals"; and insert --33-- after "conductors".

Column 6, line 40, delete the "[(" after "1000".

Signed and Sealed this

Second Day of February, 1988

Attest:

Attesting Officer

DONALD J. QUIGG

Commissioner of Patents and Trademarks